United States Patent [19]

Hautzenroder

[11] Patent Number: 5,372,508

[45] Date of Patent: Dec. 13, 1994

[54] TRAINING DEVICE FOR FLUID TECHNOLOGY

[75] Inventor: Manfred Hautzenroder, Neuss, Germany

[73] Assignee: Parker Hannfin NMF GmbH, Germany

[21] Appl. No.: 39,053

[22] PCT Filed: Oct. 3, 1991

[86] PCT No.: PCT/DE91/00782

§ 371 Date: Apr. 5, 1993

§ 102(e) Date: Apr. 5, 1993

[87] PCT Pub. No.: WO92/06459

PCT Pub. Date: Apr. 16, 1992

[30] Foreign Application Priority Data

Oct. 6, 1990 [DE] Germany ............... 4031719

[51] Int. Cl.$^5$ .................. G09B 9/00; G09B 19/00; G09B 25/00
[52] U.S. Cl. ...................... 434/126; 446/89
[58] Field of Search ............. 433/276, 126; 446/85, 446/89

[56] References Cited

U.S. PATENT DOCUMENTS 3,673,705  7/1972  Wright et al. .......... 434/126
4,080,752  3/1978  Burge ................... 446/89
4,667,427  5/1987  Been ................... 40/442
5,178,543  1/1993  Semans et al. .......... 434/218

FOREIGN PATENT DOCUMENTS 8701840  5/1987  Germany.
2048088  12/1980  United Kingdom ....... 446/89

Primary Examiner—Paul J. Hirsch
Assistant Examiner—Cindy A. Cherichetti
Attorney, Agent, or Firm—Ralph E. Jocke

[57] ABSTRACT

A training device for the graphic representation of the fluidic processes and functions for basic and advanced fluidics training, with an essentially vertically oriented panel, on which fluidic practice devices are mounted in a systematic arrangement and are controllable by means of directly or indirectly operated directional valves through permanently installed tube connections to create various functional flow path patterns, is improved upon with regard to its handling characteristics and its instructional utility. Toward this end it is provided that each practice device is coupled with a movable symbol plate (12) on the face of which the flow-path alternatives (13) of the practice device are indicated, and that the movement of the symbol plate (12) is directly translatable into the hydraulic loading of the practice device.

20 Claims, 8 Drawing Sheets

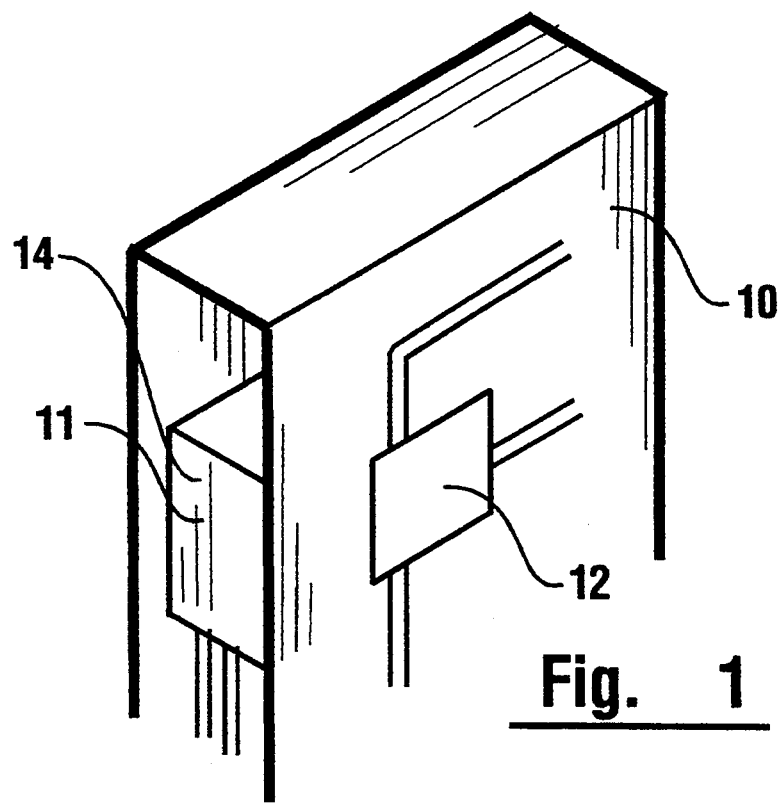
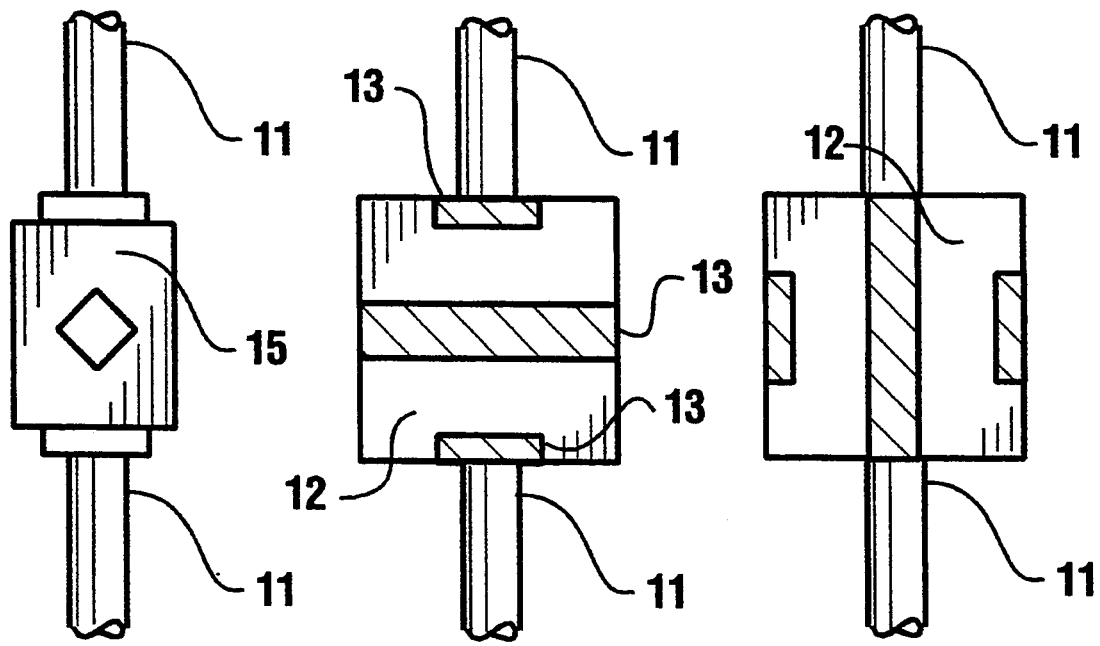

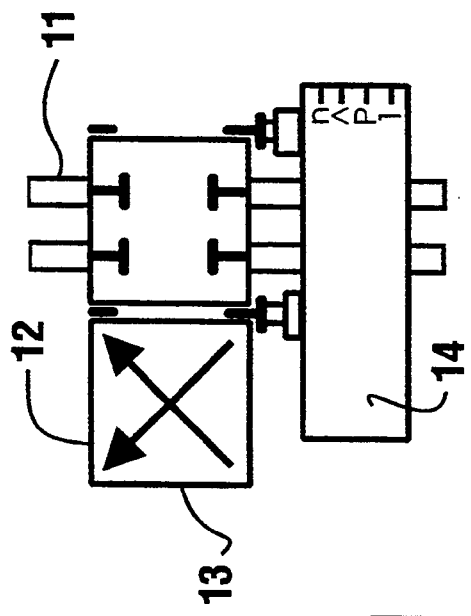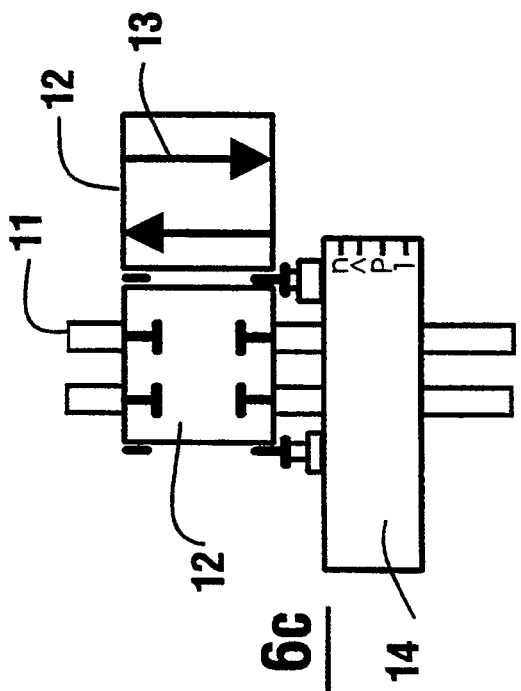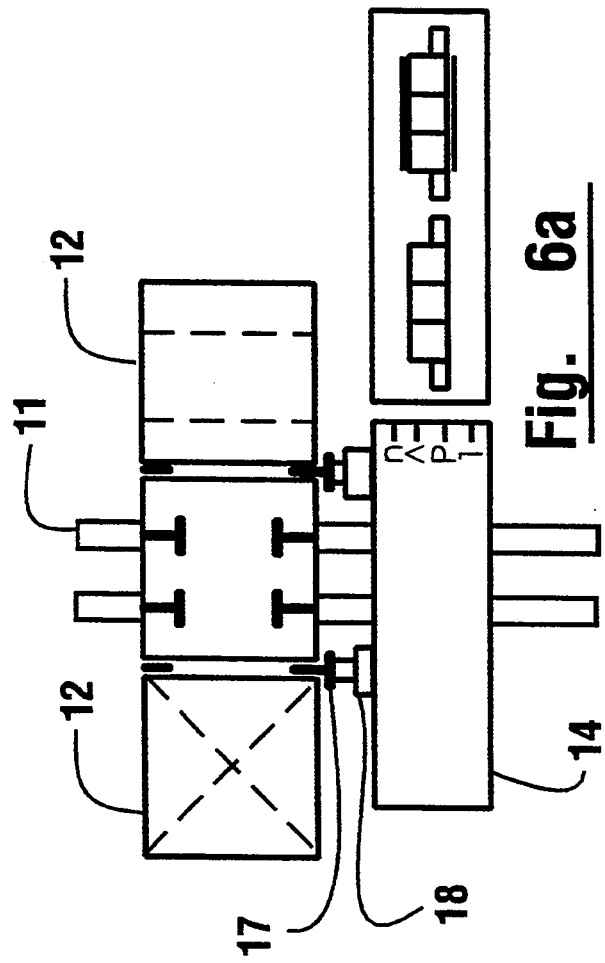

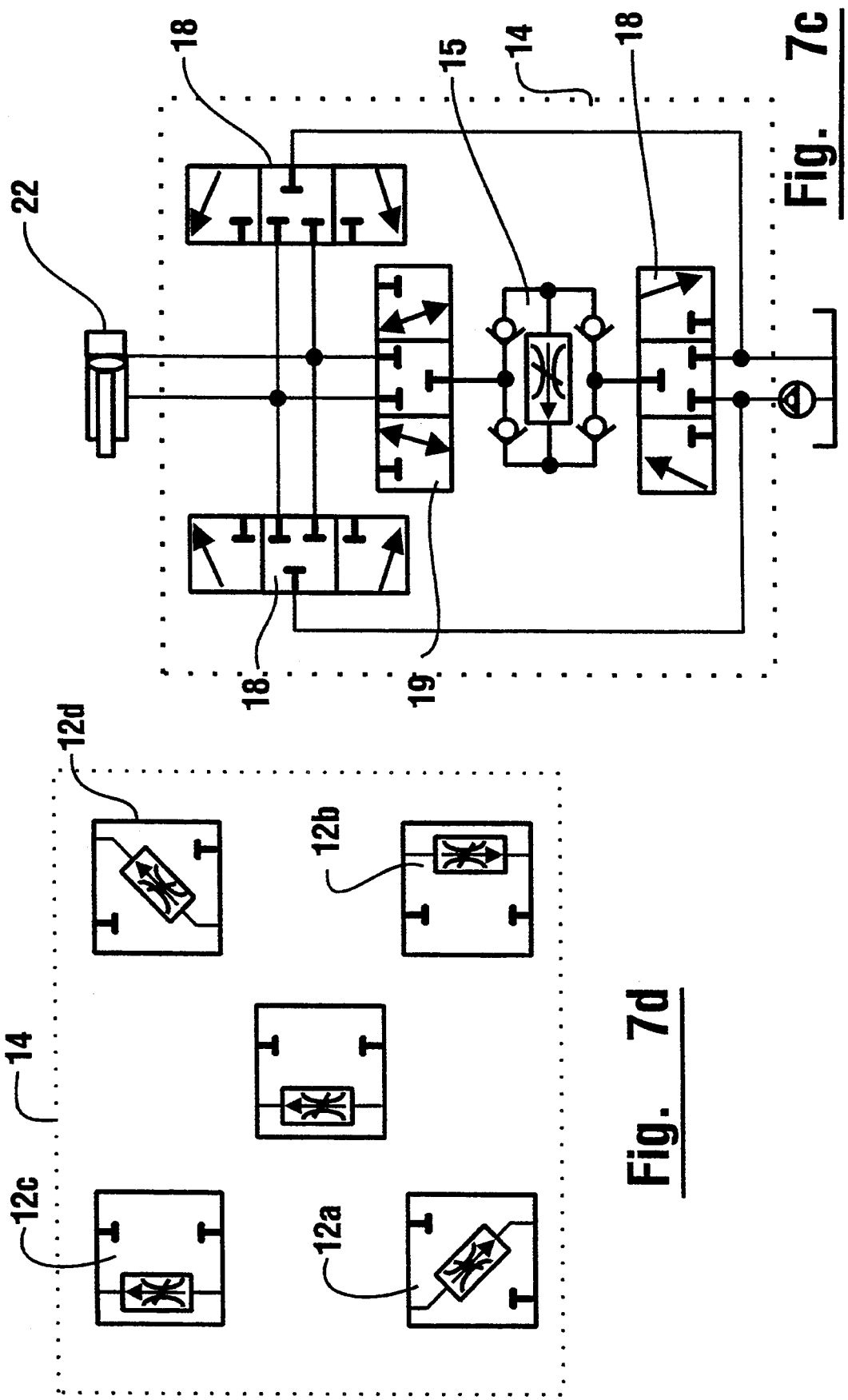

TRAINING DEVICE FOR FLUID TECHNOLOGY

SPECIFICATION

The invention concerns a training device for the graphic representation of the fluid processes and functions of fluidics, hydraulics in particular, for basic and advanced training, with an essentially vertically oriented panel, to which fluidics training devices are mounted in a systematic arrangement, with the capability of being jointly made to perform various functional operations, through tubing firmly attached to the panel, by means of manually- or remote controllable directional valves.

A training device of this kind is described in the German Design Patent 88 05 364. In the device shown therein, selected typical fluid devices are attached to the front of the demonstration panel in an arrangement whereby the incoming and outgoing tubes are permanently connected on the back side of the panel in a corresponding pattern. Directional switching being accomplished by controllable shut-off valves also mounted on the back side of the panel. The flow patterns in the tubes corresponding to the functional flow diagrams are intended to be highlighted on the front of the demonstration panel by means of magnetic strips affixed thereon.

With regard to this prior art device, it has the disadvantage that during training or in problem-solving the flow diagrams are intended to be created primarily by means of the addition of the magnetic line symbols, while the carrying out of this flow diagram must be accomplished by operating the corresponding shut-off valves, which creates the problem of a mirror-image transformation of the flow diagram created on the front side of the flow chart panel. This represents some difficulties not merely for the instructor but especially for the trainees. A further disadvantage stems from the fact that in a training session the trainees cannot determine from the front of the panel which functions from the back of the panel are being performed.

An additional disadvantage arises from the fact that the creation of flow diagrams by means of the loose magnetic strips delineating the layout of the tube lines involves additional work and preparation of the instructional setup, and, with frequent use of the demonstration panel in the course of instruction, mistakes due to the strips coming off or being dislocated cannot be ruled out. Moreover, the switch-condition symbols being used are relatively small and are also in constant view on those devices not forming part of a demonstration flow pattern.

The present invention has as its basic objective to improve a training device of this type in such a way that its operation is simplified and the training device can be made to better serve its didactic purpose.

The solution for this objective, including advantageous forms and further developments, is to be found in the content of the patent claims, which follows this specification.

The invention starts with the basic concept that each demonstration device attached to the demonstration panel is coupled to a symbol plate movably affixed to the demonstration panel, with the visible side of the symbol plate showing the flow direction alternatives of the demonstration device, and that the movement of the symbol plate can be converted into the hydraulic impingement on the demonstration device.

Associated with the invention is the advantage that the tubing layout with the integrated demonstration devices are at all times immutably fixed on the front side of the demonstration panel, and are thus in plain view of the trainees in every position. The creation of the hydraulic flow circuit as the objective of the exercise is accomplished by moving the symbol plates, thus creating with the symbol plates a second demonstration plane in relation to the surface of the demonstration panel, so that at any time at least two functions can be demonstrated with one movement of the symbol plate. While on the surface of the demonstration panel the fixed layout of the hydraulic lines is visible, the symbol plate carries that hydraulic flow pattern which is actually being directly selected by the movement of the symbol plate and the associated control of the demonstration device, without any need to actuate additional valves to convert the flow circuit diagram into the actual condition. The training device of the invention is distinguished by a didactically clear and simple construction, providing a direct integration of the creation of the flow circuit diagram and the control of the functioning of the demonstration flow control devices.

A further advantage is that all manipulations of the training apparatus are visible from the front, and thus for the course participants, without the necessity of having to perform concealed operations on the back side. No loose pieces or demonstration objects that need to be attached to the panel at the time of instruction are required, so that no special additional effort is required either for preparatory setup or for carrying out the exercises. The symbol plates can be made in a large format, so that even with a large number of trainees the valve position symbols are clearly visible. Moreover, it is to good advantage that only the symbols of those demonstration devices that are actually in operation and thus involved in the demonstration circuit of the moment are visible, which is an advantage in understanding the circuit plan. Because of the direct coordination of the circuit symbols with the function of the demonstration devices, the symbols are no longer shown in a different location, apart from the demonstration device, but are, in fact, constituents of the apparatus itself. This allows exercises to be carried out "dry" initially, that is, without a load, actuated by pressure, for example, or, on the other hand, under operation conditions. This makes it possible for theoretical instruction and the preparatory phase for the practical exercises to be carried out entirely on the circuit panel without additional teaching aids. The symbols system, line layout and direction-control functions are interlinked in a didactically clear manner. The transition from theoretical preparation to the practical execution proceeds in readily understandable fashion without a switch in mental imagery by the trainee, due to the retention of the same illustrative devices. That is, the theoretical flow-circuit manipulations are without exception identical to the subsequent practical line-connection maneuverings. Thus, theory and practice, circuit diagram and line array, symbols and functional demonstration device are interlinked in an exemplary manner.

The direct connection of the symbol plate with the demonstration device can be established at any time in the case of demonstration devices with two functions, for example Open/Shut functions. Where, according to one version of the invention, the demonstration devices have several functions, a preferred version of the invention provides for a switching valve to be inserted between the demonstration device and the symbol plate, the symbol plate being coupled with the switching valve, and the switching valve actuating the demonstration device based on input from the symbol plate. In this connection, it is especially advantageous, according to one version of the invention, to have the demonstration device, switching valve and symbol plate brought together on a control block mounted on the demonstration panel, the control block being connected to the permanent tube line connection on the demonstration panel.

In a special way, this creates the advantage that, even with elaborate demonstration devices having multiple switching functions, a simple manipulation of the symbol plate produces an immediate positive changeover in the directional configuration, with an attendant benefit for the learning process. With the movement of the symbol plate the demonstration device is turned to "closed" or off, while the valve symbol on the symbol plate is visible only when the demonstration device is shut off in relation to the tube-line array. The symbols on the symbol plate make it quite clear whether the line connection is open or blocked, since here the second representation plane created by the symbol plate covers the fixed tube line array that is pre-drawn on the demonstration panel.

According to a preferred version of the invention, the control valves, mounted in the control block and linked with the demonstration device in the control block by appropriate borings, are constructed as rotary-piston valves in such a way that the manipulation of the symbol plate can be translated through the subsequent actuation of the control valve into the various flow-direction alternatives of the demonstration device. In this connection, according to examples of versions of the invention, various motion alternatives are possible.

For example, the symbol plate can be mounted to the control block in a rotatable manner and connected axially with the control valve and/or the demonstration device. Alternatively, the symbol plate can also be mounted in a pivoting manner around an eccentrically mounted bearing point, with the pivot shaft connected to the control valve and/or the demonstration device, so that the pivoting of the symbol plate, and the attendant rotary motion of the eccentric shaft, actuate the control valve.

In an additional alternative solution, the symbol plate can be mounted on the control block in a hinged manner, with the hinge-like pin connected to the control valve and/or the demonstration device. In this connection, the symbol plate can also be made of several parts, with various control alternatives indicated on its individual parts, each part of the symbol plate being assigned to one of the control valves on the control block, with corresponding borings in the control block for admitting fluid to the demonstration device. Such an arrangement appreciably enlarges the number of possible circuit arrays which can be realized for exercise purposes.

In this connection, the symbol plates may be mounted with respect to the viewing direction toward the demonstration panel either in front of the control block, covering the latter, or also adjacent to the control block, where in the case of the side-by-side arrangement it is possible additionally to display the possible flow-control functions of the fluidics demonstration device.

The hydraulic actuators to be operated by way of the fluidic circuit arrays by the instructional device may, according to an example of a version of the invention, be mounted on the front of the demonstration panel in simple application forms.

However, a particular advantage of the invention may be achieved by having these hydraulic actuators mounted on a second, separate actuator panel, with the actuator panel connected to the demonstration panel by hose connections. The length of these hose connections in this arrangement permits a variety of positions of the demonstration panel and actuator panel relative to each other. For instance, an arrangement of the two panels next to each other serves the lecture process particularly well. If a trainee is to operate and control both panels, it is recommended that the panels be positioned at an angle smaller than 180 degrees to each other. At a stage in the training where the trainee at the actuator panel should not see at once, at the actuator panel, the practical effect of his control actions on the demonstration panel, the panels can also be set up back to back to each other, so that the actuator panel also cannot be seen from the servicing area of the demonstration panel.

An important possibility arises from the fact that the two panels can be put together to form a compact unit enclosing the devices and tube lines mounted on the fronts of the panels, thus providing for safe storage and transportation.

A version of the invention provides for the demonstration panel to be constructed as a box, with the control blocks and tube connections mounted between the panel surfaces, and with the movable symbol plates attached to the front of the demonstration panel by means of the operating shafts leading to the control block. In this case, all the line connections must naturally be displayed on the front of the demonstration panel. In this connection, a preferred version of the invention provides for having on the front of the panel additional illustrations of parts of the line connections and other components, for example threaded connections, in the form of cross-sectional drawings, in order to convey additional information. It is understood that the requisite metrology, for example for the measurement of pressure, flow rate, temperature, force and output, are integrated into the training device.

BRIEF DESCRIPTION OF DRAWINGS

Shown in the drawings, in a schematic representation, are examples of versions of the invention, which are described below. Shown in:

FIG. 1 is a demonstration panel with a mounted control block in an illustrative representation.

FIGS. 2a through c show a symbol plate mounted in a rotatable manner on the demonstration panel, in a schematic representation.

FIGS. 6a through c show a control block with several associated symbol plates.

FIGS. 7a through d show a control block with several associated symbol plates and their possible control connections.

BEST MODES FOR CARRYING OUT INVENTION

Figure 3A:
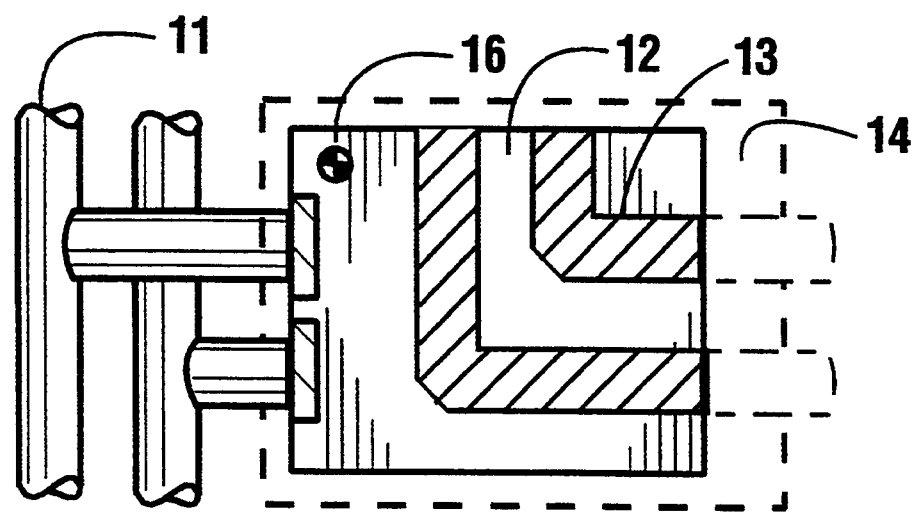
FIGS. 3a and b show in a schematic illustration, a pivoting symbol plate mounted on the control block.

Shown in FIG. 1 is the schematic construction of a demonstration panel 10, which has a box-like form. Inside the box formed in this manner are firmly attached tubing lines 11, to which a control block 14 is connected. Placed within this control block is a fluidics demonstration device and, as appropriate, a directional [switching] valve, as will be discussed later. On the front surface of the demonstration panel 10 there is a symbol plate 12 which is mounted in movable fashion to the control block 14. Also on the front of the demonstration panel 10, the tube lines installed in the box-like interior of the demonstration panel 10 are shown by drawn representation.

Alternatively, the demonstration panel 10 may be constructed in the form of a plate, in which case the tube lines 11 as well as the control blocks 14 are mounted on the flat frontal side of the demonstration panel 10, so that there is then no need to use drawings to depict the tubing lines.

FIGS. 2a to c show a first example of a version for allocating the symbol plate 12 to a practice device 15, where in this example the control block and the corresponding incorporated directional valve are omitted. In this example, the symbol plate 12 is directly connected with the device 15, the latter having only two functions in this case. FIGS. 2b and 2c show the symbols 13 visible to the observer looking down on the plan view of the demonstration panel 10, where two positions, namely a blocked position and a connecting position, may be seen as direction control alternatives with regard to the tubing lines 11 visible on the demonstration panel 10, the selected position being transmitted to the tubing lines 11 by rotating the symbol plate 12. The rotation of the symbol plate 12 directly actuates the practice device 15 installed on the pipeline 11 in accordance with the symbol display 13.

Figure 3B:
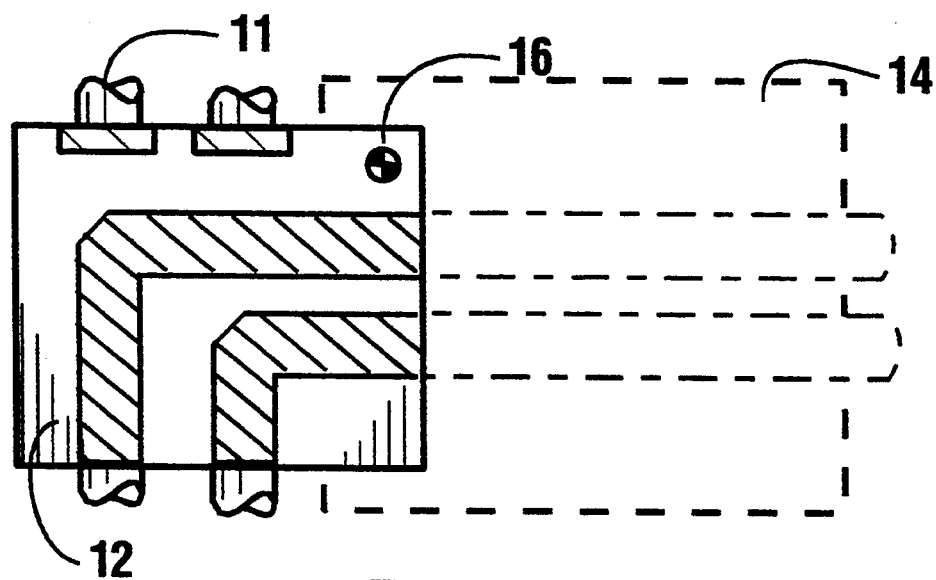

FIGS. 3a and 3b illustrate a version of the invention in which the symbol plate 12 is pivotable around an eccentrically positioned pivot point 16 in relation to the control block 14 located underneath. Shown in FIG. 3a are the tubing lines 11 with their connections to the control [switching] block 14, which are closed off with the symbol plate 12 positioned as shown in FIG. 3a. If the symbol plate is pivoted into the position shown in FIG. 3b, this pivoting movement not only causes the pipeline flow pattern currently in effect to be graphically represented, through the rotating shaft 16, but this movement also switches the pipeline connections in the control block 14 in the manner shown.

Figure 4A:
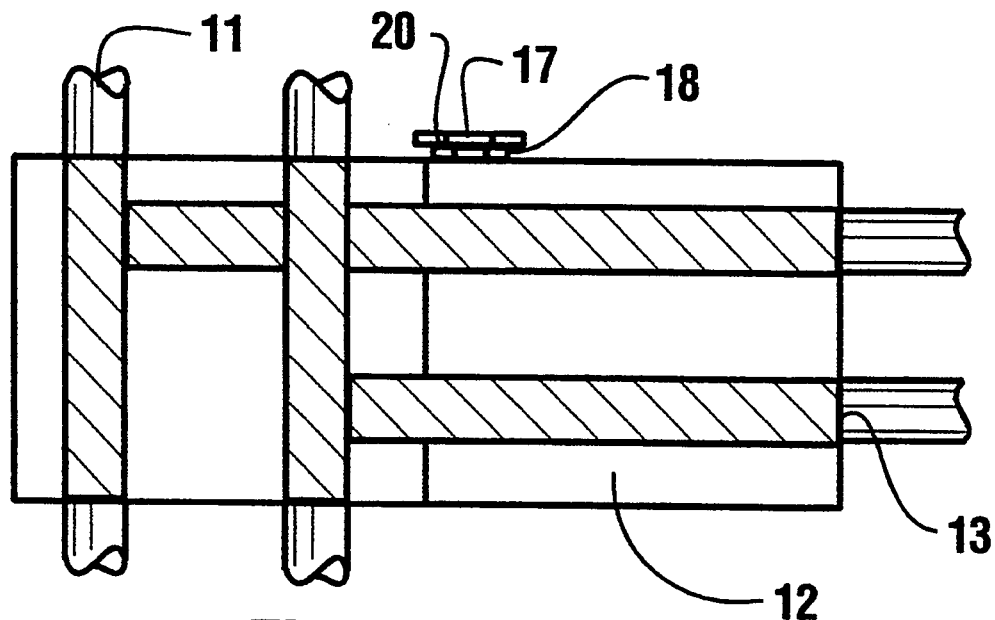
FIGS. 4a and b show a symbol plate mounted in hinged fashion on the control block in a concealed arrangement.
Figure 4B:
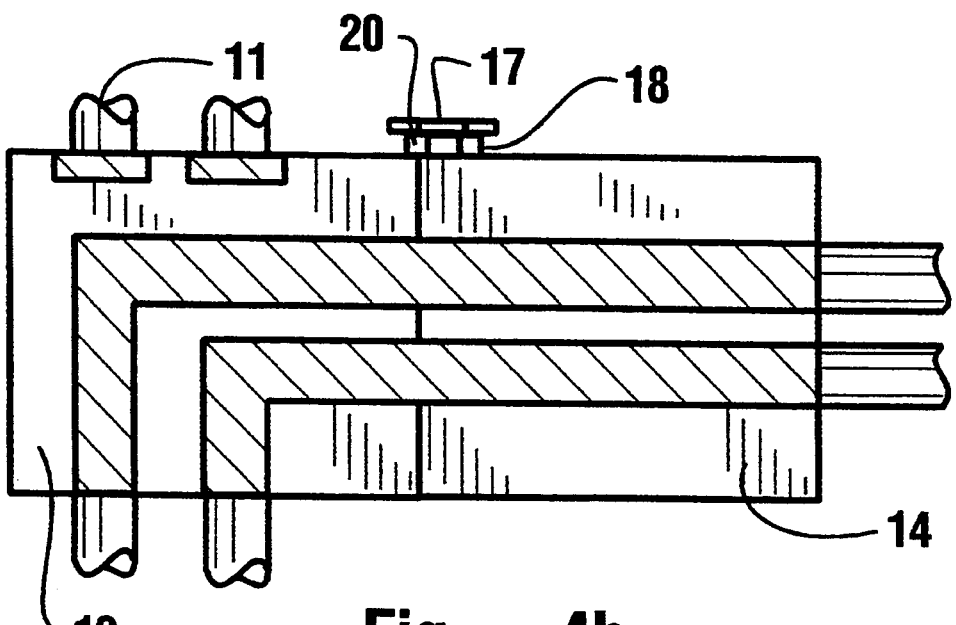

FIGS. 4a and 4b show the hinged installation of a symbol plate 12 with reference to the control block 14, where the symbol plate 12 covers the control block 14 when looking at the demonstration panel 10 in a plan view. The flipping movement occurs around a hinge-pin-like shaft 20, the rotation of which is transmitted through a gear 17 to the head of a second directional valve 18, so that the flipping movement is simultaneously translated into an actuation of the switching valve located inside the control block, and thereby into a fluid loading of the practice device. The corresponding symbol graphics are found on the reverse side of symbol plate 12.

Figure 5B:
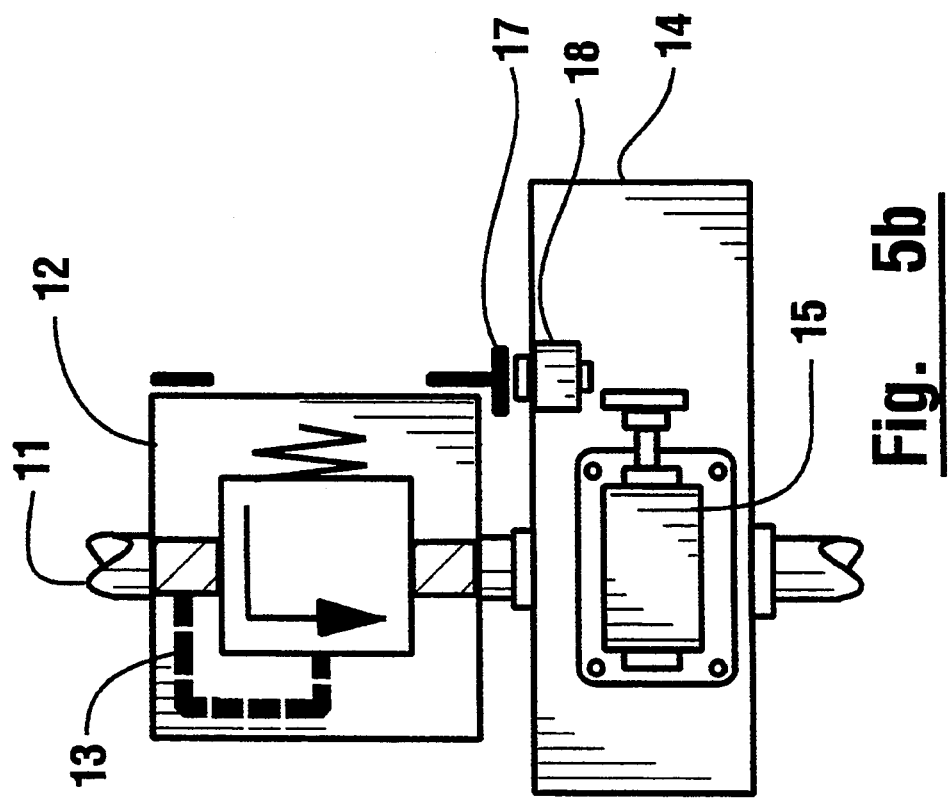
FIGS. 5a and b show a side-by-side arrangement of the symbol plate and control block.
Figure 5A:
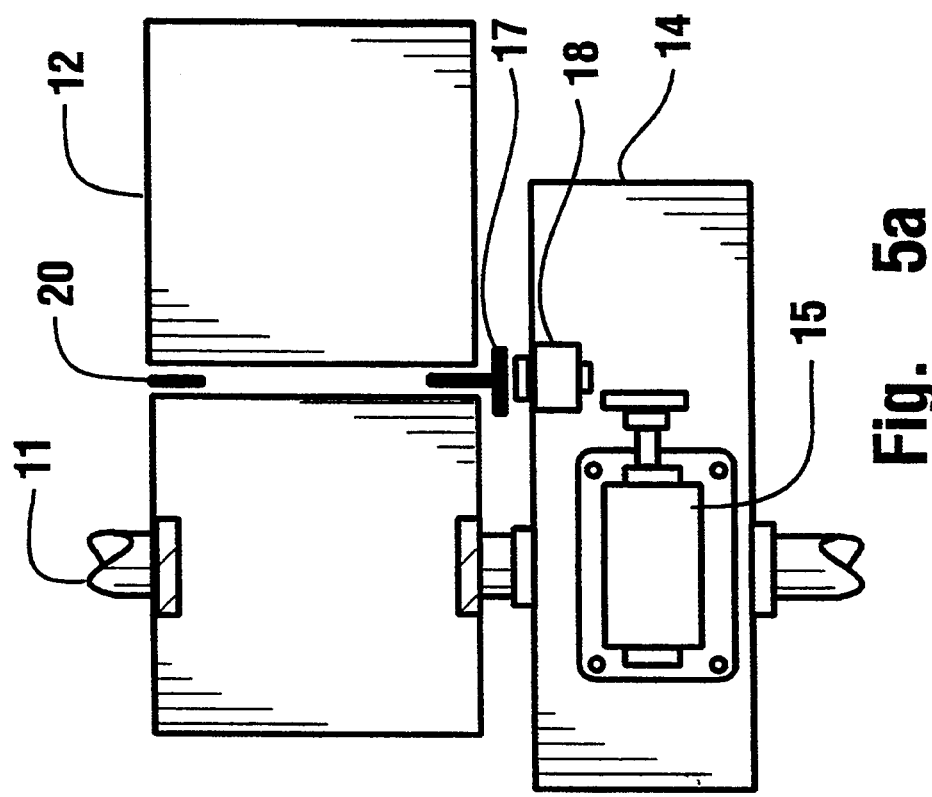

Similarly, FIGS. 5a and 5b show the hinged attachment of a symbol plate 12 laterally beside the control block 14, where again the hinge pin 20 transmits the swivel movement through the gear 17 to the directional control valve 18. The boring required in the control block 14 between the directional valve 28 and the fluidics practice device 15 is not graphically shown in this exemplification. Alternatively, in place of the permanent borings described by way of example, it is possible to provide, in a massive control block, appropriate corresponding pipelines for connecting the directional control valve fittings with those of the fluidics practice device.

FIGS. 6a to 6c show a further embodiment of the invention with two hinged symbol plates 12 on a control block 14 which contains a multiple-function practice device. In the associated control block 14 there are two direction control valves 18 that are actuated by the corresponding hinge pins 20 of the swiveling elements 12 installed on each. This particular example involves a 3-way valve-control block with the respective symbolic graphics possibilities.

Figure 7A:
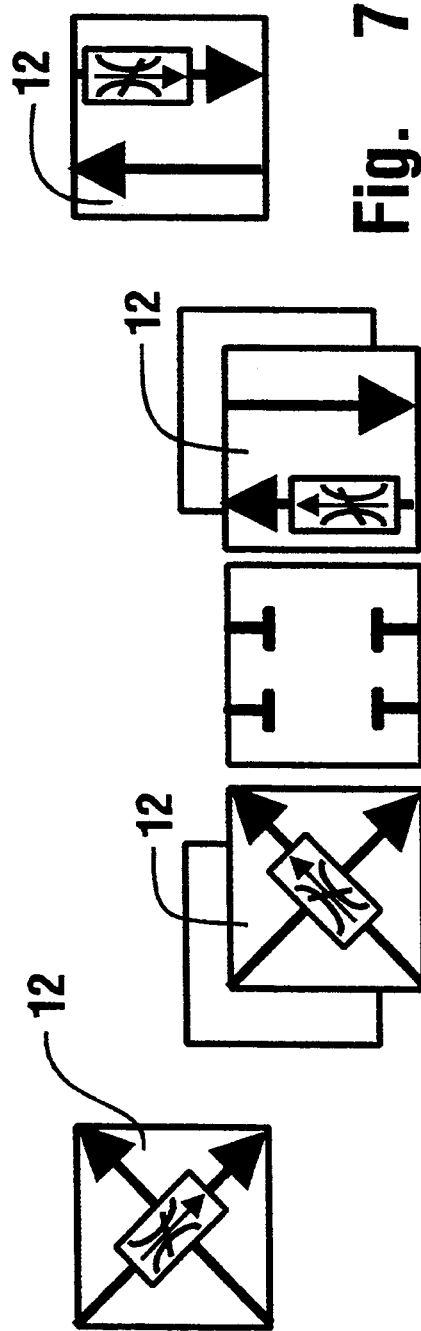
Figure 7B:
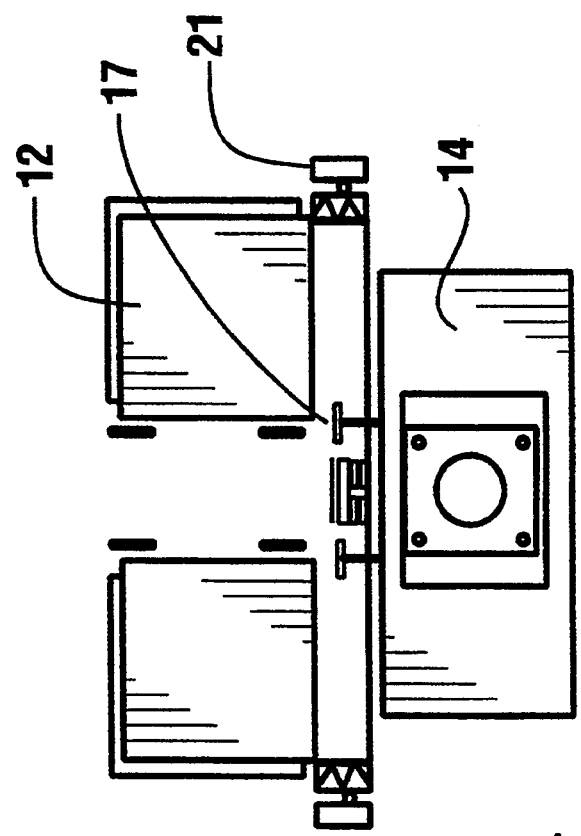

FIGS. 7a to d illustrate an exemplification in which several symbol plates 12 are arranged in two planes behind each other, with a total of four symbol plates 12 containing different symbol graphics being used. FIG. 7a shows the symbol plates 12 of the first plane, in the flipped-up condition. As can be more readily seen in FIG. 7b, the symbol plates in front, as is the case with the previously described design versions, are also coupled by way of gears 17 with the corresponding directional valves 18 located in the control block 14, while the rear symbol plates 12 are coupled with their respective directional control valves 18 through appropriate switching gears 21.

As shown by FIG. 7c, four directional control valves 18, which act on an practice device 15, are also dedicated here, within the control block 14 operating as a 4/5-way directional control, to the four symbol plates 12 which cannot be seen in this diagram. For the sake of completeness, those fluid supply lines located outside the control block 14 are illustrated here with a pump-/tank and a hydraulic actuator 22. The switching deployment of a control block equipped in this manner may be seen in FIG. 7d. Here, using the symbols of the practice device 15, is shown the latter's disposition with respect to the different switching alternatives, with the two lower flow control symbols 12a, b correspond to the front plane of the symbol plates 12 in FIG. 7a, and the upper switch position symbols 12c, d correspond to the rear plane in FIG. 7a.

FIGS. 8a to d show that aspect of the invention whereby a demonstration panel 10 is combined with an actuator panel 19, with the actuator panel 19 carrying the operational hydraulic actuators, including the drive units as well as the power equipment. The two panels are flexible connected at any given time by means of hose connections, which are not otherwise illustrated. However, few hose lines are needed, since the entire switching function is selected and set within the permanently piped practice panel.

Figure 8A:
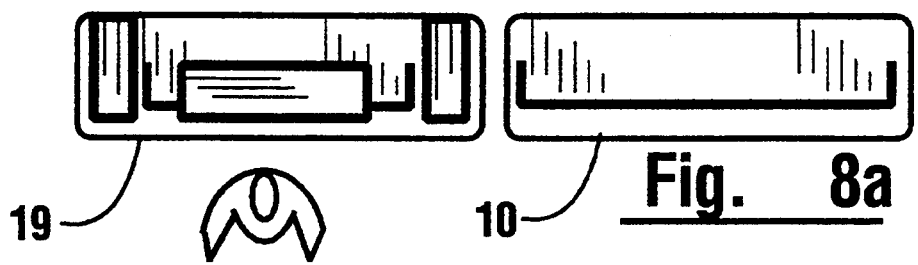
FIGS. 8a through d schematically show a demonstration panel and an actuator panel in various positions.

FIG. 8a shows the so-called lecture position, which has the two panels 10, 19 situated beside each other, so that the instructor is able to reinforce the understanding of the relationships by the trainee audience before him.

Figure 8B:
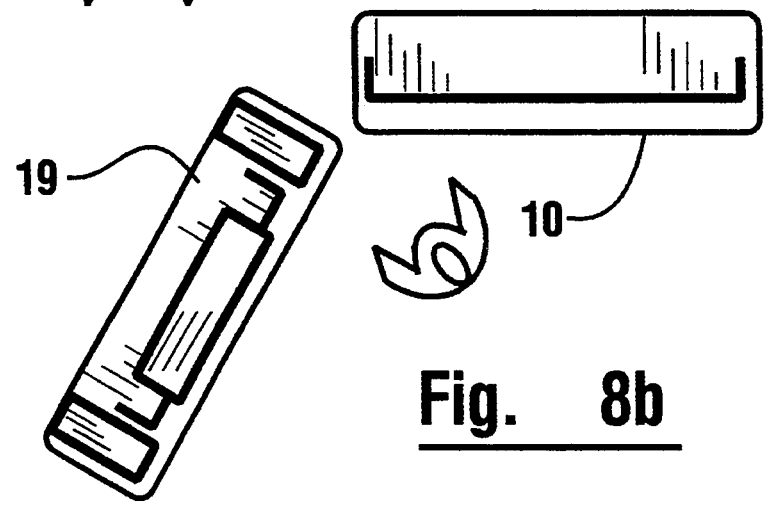

FIG. 8b illustrates the so-called practice position, in which a trainee works at both panels 10, 19, and in which he can immediately observe the success of the flow pattern selection he has made on panel 10 by looking over at the actuator panel 19.

Figure 8C:
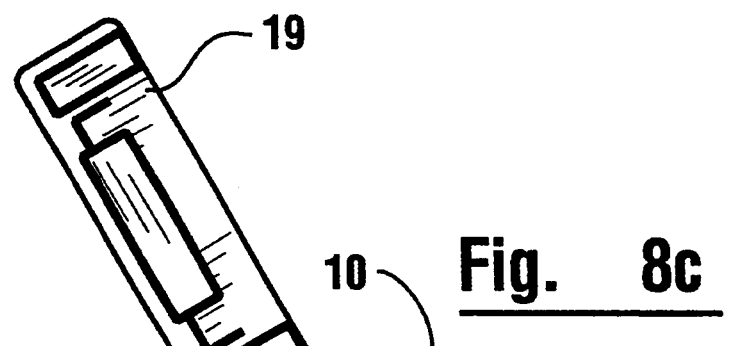

FIG. 8c shows an arrangement which is useful for training in locating problems and for conducting an examination. In this position the trainee does not have the actuator panel in view, but has to concentrate on the flow control functions on the demonstration panel 10. It is only after completion of the work on the demonstration panel 1C, that there is an opportunity to see the result of what is selected on the actuator panel 19.

Figure 8D:
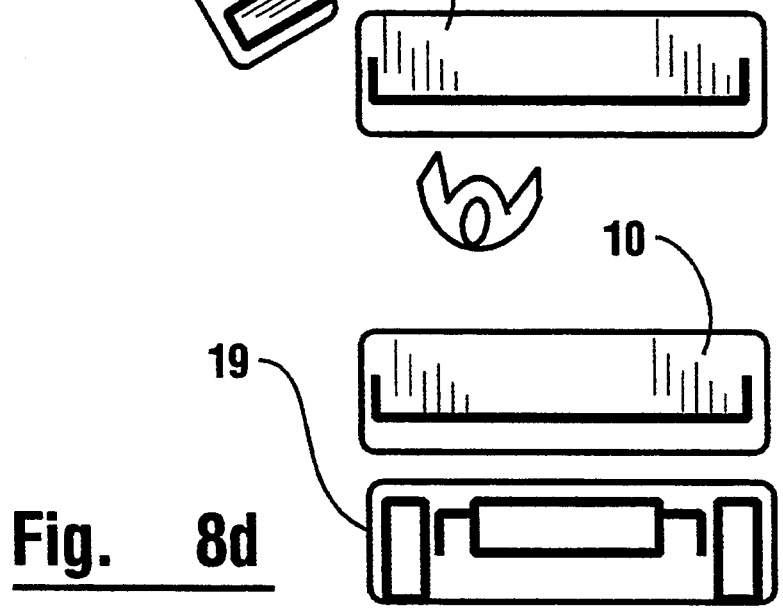

FIGS. 8d illustrates the storage and transportation position of the training device with panels 10, 19, which are folded together in such a way that the tubing lines and apparatus mounted on the front of the panels are enclosed between the panels 10, 19 and thus protected against access and damage from the outside.

As an alternative to the mechanical control connections described above by way of example, serving between a mechanically hinged symbol plate 12 and the associated flow control valves 18, it is also possible to effect the control of the control valves 18, or, as the case may be, of the practice devices 15, by electrical or electromagnetic means, particularly inasmuch as modern fluidic valves are in any event equipped with electrical controls.

In a first stage of the further development of the invention in this regard, the mechanical transmissions 17, 21 may, accordingly, be replaced by electrical signals that are emitted, for example, through associated switches by movably mounted symbol plates 12, as before.

It is also a part of the invention, however, to depart from the mechanically movable symbol plates 12, and to fashion these symbol plates as controllable displays, with various symbol graphics, in which case the symbol plates as well as the [flow] control blocks are connected to an input station operated by the instructor or by a trainee. This input station has controls for the individual practice devices and in addition disposes over all of the possible symbols within the framework of the training device, so that each practice device can be controlled by means of appropriate symbols from the input station. When this control is operated in accordance with a predetermined practice circuit diagram, not only does the respective input cause the corresponding symbol to appear on the associated display 12, but the control signal also leads to an immediate actuation of the associate directional valve 18 in accordance with the designated symbol, so that a direct actuation of the fluid flow control switching is effected from the input station.

Such equipment, which is built on the basic concept of the invention, has the particular advantage that from the location of a central input station the demonstration panel 10, including, as the case may be, an actuator panel 19 which may also be provided, can be seen by the trainee, who no longer needs to work at the panel itself. Moreover, the entire instructional exercise sequence, as regards the makeup of a circuit pattern as well as the operation of the devices used, can be shown on a central large-surface display, for example in the form of a screen or a multimedia panel, so that especially other trainees have the possibility of directly following the actions of the one doing the exercise.

This has the advantage that, although there is a large-scale visual representation, no simulation, no animation, no trick film and no unrealistic substitute models are used, but rather an exercise under actual operation conditions is carried out, while the exercise process is nevertheless rendered visible and understandable for a large number of participants.

It is understood that not only are the operation of the practice devices and the correlation of the tubing flow pattern integrated into this flow pattern exercise, but that the operational and measurement data following from the trial flow array as a consequence of the selected directional switch setting are likewise visually displayed in a logical fashion and interrelation, so that at any time a complete overview of the exercise process is available.

Finally, the training device according to the invention is not restricted to the display of hydraulic trial processes. The training device can, indeed, be used with other media as well, within the framework of any fluidic relationship. This applies particularly to the filed of pneumatics, where comparable relationships and visual representation problems in the training of employees exist.

The characteristics of the subject of these documents as disclosed in the preceding specification, the patent claims, the summary and the drawings may individually as well as in any mutual combinations whatever may be material to the realization of the invention in its diverse versions.

I claim:

1. A training apparatus for training fluidic processes and functions,
   comprising:
   a display panel including a visually observable face portion;
   a plurality of fluidic practice devices mounted on said apparatus, said practice devices interconnected in a systematic arrangement by piping means for enabling fluid flow thereinbetween, said face portion including graphical indicia representative of said systematic arrangement, said fluidic practice devices including at least one valve means for controlling the flow of fluid therethrough;
   said graphical indicia including manually selectable visual display means on said face portion for selectively displaying graphical representations of flow conditions of said valve means, said selectable visual display means in operative connection with said valve means, and wherein said condition of said valve means is in correspondence with the flow condition graphically displayed by said display means.

2. The apparatus according to claim 1 wherein said display means includes movable plate means, said plate means including at least one display surface having a graphical representation of possible valve conditions thereon.

3. The apparatus according to claim 2 wherein said valve means includes a directional control valve, and wherein said plate means includes at least two graphical representations of valve conditions, and wherein said plate means is movable to visually expose said graphical representations on said plate means, and wherein said plate means is in operative connection with said directional control valve to control a condition of said valve in accordance with a visually exposed graphical representation.

4. The apparatus according to claim 3 wherein said plate means is rotatable and is in operative connection with a shaft means, and wherein said shaft means extends through said face portion of said display panel.

5. The apparatus according to claim 4 wherein said plate means is mounted eccentrically with respect of an axis of rotation of said shaft means.

6. The apparatus according to claim 5 wherein said fluid practice devices include at least one fluid actuated device, and wherein said apparatus comprises a first body, said first body including a display panel thereon, and a second body having a visually observable fluid actuated device thereon, said first and second bodies separable from one another, whereby viewing of said fluidic actuated device and said face portion by an individual selectively moving said plate means is enabled.

7. The apparatus according to claim 6 wherein said first and second bodies are connected by at least one flexible fluid conducting means, and wherein said second body is positionable in a location wherein said fluid actuated device on said second body is not observable by an individual selectively moving said plate means.

8. The apparatus according to claim 7 wherein said first and second bodies are engageable as a compact unit for shipping purposes, and wherein when said bodies are engaged said face portion is unexposed whereby damage thereto is avoided.

9. The apparatus according to claim 1 wherein said fluidic practice devices include at least one fluid actuated device, and wherein said apparatus comprises a first body, said first body including said display panel thereon, and a second body having a visually observable fluid actuated device thereon, said first and second bodies separable from one another, whereby viewing of said fluidic actuated device and said face portion by an individual manually selecting said display means is enabled.

10. The apparatus according to claim 9 wherein said first and second bodies are connected by at least one flexible fluid conducting means, and wherein said second body is positionable wherein said fluid actuated device on said second body is not observable by an individual manually selecting said display means.

11. A method for demonstrating fluidic processes and functions for training purposes,
comprising the steps of:
connecting with piping means a plurality of fluidic practice devices in a systematic arrangement, said fluidic practice devices including at least one valve means;
providing graphical indicia representative of said systematic arrangement on a face portion of a display panel, said graphical indicia including manually selectable visual display means on said face portion for selectively displaying by an individual graphical representations of a flow condition of said valve means;
operatively connecting said display means and said valve means wherein said flow condition of said valve corresponds with said selected graphical representations of said display means; and
manually selecting said display means to control said valve means to be operative in said systematic arrangement in accordance with the graphical indicia on said display panel.

12. The method according to claim 11 wherein said display means includes manually movable plate means including at least one display surface having a graphical representation of a possible valve condition thereon, and wherein the step of manually selecting said display means includes manually moving said plate means to position said graphical representation.

13. The method according to claim 11 wherein said fluidic practice devices include at least one visually observable fluid actuated device, and wherein said method further comprises the step of visually observing said fluid actuated device, whereby the consequences of said condition manually selected is observed.

14. The method according to claim 12 wherein said display panel is positioned on a first body, and said fluid actuated device is mounted on a second body, said second body separable from said first body, and wherein said method further comprises the step of positioning said second body in a first position wherein said individual engaging in manual selection at said display panel may observe said actuated device, or alternatively positioning said second body in a second position whereby said individual may not observe said actuated device, whereby testing of said individual's knowledge may be conducted.

15. The method according to claim 14 wherein said valve means includes a directional control valve, and wherein said plate means includes at least two graphical representations of conditions of said control valve, and wherein the step of manually selecting said display means includes moving said plate means to visually expose a graphical representation of said valve condition.

16. The method according to claim 15 wherein said plate means is rotatable and said plate means is in operative connection with a shaft means extending through said face portion of said display panel, wherein said step of manually selecting said display means includes rotating said plate means to rotate said shaft means, whereby said condition of said control valve is changed to correspond with said visually exposed graphical representation.

17. The method according to claim 16 and further comprising the step of engaging said first and second bodies with engaging means to form a compact unit condition for transport, wherein said face portion of said display panel is not exposed.

18. A training apparatus for training fluidic processes and functions, comprising:
a display panel including a visually observable face portion;
a plurality of fluidic practice devices, said practice devices fluidly interconnected in a systematic arrangement, said face portion including graphical indicia representative of said systematic arrangement, said fluidic practice devices including at least one fluid valve;
said graphical indicia including a manually selectable visual display on said face portion, wherein said visual display selectively displays visual representations of conditions of said valve, and wherein said visual display is in operative connection with said valve, whereby said displayed visual representation corresponds with said valve condition.

19. A training apparatus for training fluidic processes and functions, comprising:
a first body, said first body including a visually observable face portion;
a plurality of fluidic practice devices, said practice devices fluidly interconnected in a systematic arrangement, said face portion including graphical indicia representative of said arrangement, said fluidic practice devices including at least one valve;
said graphical indicia including a manually selectable visual display on said face portion, wherein said visual display selectively displays visual representations of conditions of said valve, and wherein said visual display is in operative connection with said valve whereby said displayed representation corresponds with said valve condition;

a second body, said second body having a fluid actuated one of said practice devices mounted in visually observable relation thereon, wherein said second body is separable from said first body, whereby said first and second bodies are selectively positionable to control simultaneous viewing of said fluid actuated device on said second body by a person selecting said display.

20. A method for demonstrating fluidic processes and functions for training purposes, comprising the steps of:

connecting a plurality of fluidic practice devices in a systematic arrangement, said practice devices including at least one valve means and at least one fluid actuated device;

providing graphical indicia representative of said systematic arrangement on a face portion of a display panel, said graphical indicia including manually selectable visual display means on said face portion for selectively displaying a graphical representation of a flow condition of said valve means selected by an individual, said display panel being mounted on a first body and said fluid actuated device mounted on a second body separable from said first body;

operatively connecting said display means and said valve means wherein said flow condition of said valve corresponds with said individual selected graphical representation on said display means;

positioning said second body in a first position wherein said individual manually selecting said display means at said display panel may observe said actuated device or alternatively positioning said second body in a second position wherein said individual may not observe said actuated device, whereby testing of said individual's knowledge may be conducted;

manually selecting said display means to control said valve means to be operative in said systematic arrangement in accordance with the graphical indicia on said display panel.

* * * * *